(12) United States Patent
Wei

(10) Patent No.: US 11,562,478 B2
(45) Date of Patent: Jan. 24, 2023

(54) METHOD AND SYSTEM FOR TESTING FIELD OF VIEW

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 64 days.

(21) Appl. No.: 16/768,144

(22) PCT Filed: Nov. 25, 2018

(86) PCT No.: PCT/CN2018/117348
§ 371 (c)(1),
(2) Date: May 29, 2020

(87) PCT Pub. No.: WO2019/105315
PCT Pub. Date: Jun. 6, 2019

(65) Prior Publication Data
US 2020/0388019 A1 Dec. 10, 2020

(30) Foreign Application Priority Data

Nov. 30, 2017 (CN) .......................... 201711240834.X

(51) Int. Cl.
*G06T 7/00* (2017.01)
*G06T 7/62* (2017.01)
*G01M 11/02* (2006.01)

(52) U.S. Cl.
CPC .......... *G06T 7/001* (2013.01); *G01M 11/0242* (2013.01); *G06T 7/62* (2017.01)

(58) Field of Classification Search
None
See application file for complete search history.

(56) References Cited

U.S. PATENT DOCUMENTS 5,402,224 A * 3/1995 Hirukawa ........... G03F 7/70633
356/124
5,731,902 A 3/1998 Williams et al.
(Continued)

FOREIGN PATENT DOCUMENTS

CN 101166289 A 4/2008
CN 101191994 A 6/2008
(Continued)

OTHER PUBLICATIONS

English Machine Translation of CN-105787980A (Year: 2016).*
First office action of Chinese application No. 201711240834.X dated Jan. 6, 2022.

*Primary Examiner* — Tyler W. Sullivan
(74) *Attorney, Agent, or Firm* — Fay Sharpe LLP

(57) ABSTRACT

Disclosed herein is a method for testing a field of view. The method includes arranging an image acquisition apparatus at a predetermined observation position of an image output device, and arranging a grid line apparatus at a predetermined distance in front of the image acquisition apparatus. The method further includes controlling the image output device to output a test pattern; moving the grid line apparatus, and keeping the distance between the grid line apparatus and the image acquisition apparatus unchanged, such that a centerline of the grid pattern coincides with a centerline of the test pattern. Additionally, included in the method is capturing an image of the grid pattern and the test pattern by the image acquisition apparatus; and determining a field of view of the image output device according to a relationship between the test pattern and the grid pattern in the captured image.

15 Claims, 8 Drawing Sheets

(56) References Cited

U.S. PATENT DOCUMENTS

| | | | |
|---|---|---|---|
| 8,345,094 B2* | 1/2013 | Demers | G01N 21/954 |
| | | | 73/1.01 |
| 2007/0024627 A1 | 2/2007 | Oka et al. | |
| 2007/0103747 A1* | 5/2007 | Powell | G02B 13/22 |
| | | | 348/E9.026 |
| 2008/0088527 A1 | 4/2008 | Fujimori et al. | |
| 2008/0129833 A1 | 6/2008 | Jao et al. | |
| 2012/0182416 A1* | 7/2012 | Kawaguchi | H04N 9/3185 |
| | | | 353/69 |
| 2014/0152956 A1* | 6/2014 | Silva | G02C 13/003 |
| | | | 351/204 |
| 2014/0232871 A1* | 8/2014 | Kriel | G06T 7/80 |
| | | | 348/148 |
| 2015/0054917 A1* | 2/2015 | Coon | G06T 7/00 |
| | | | 348/46 |
| 2015/0193983 A1 | 7/2015 | Katz et al. | |
| 2015/0288956 A1* | 10/2015 | Mallet | G01B 21/042 |
| | | | 348/188 |
| 2016/0286164 A1* | 9/2016 | Kratz | G06T 7/246 |
| 2017/0195647 A1* | 7/2017 | Honkanen | G03B 21/147 |
| 2018/0224592 A1 | 8/2018 | Holdsworth | G06T 7/001 |
| 2020/0386992 A1* | 12/2020 | Wei | H04N 17/00 |
| 2022/0091048 A1* | 3/2022 | Xu | G06T 7/60 |

FOREIGN PATENT DOCUMENTS

| | | | | |
|---|---|---|---|---|
| CN | 104079927 A | | 10/2014 | |
| CN | 105787980 A | * | 7/2016 | |
| CN | 105850113 A | | 8/2016 | |
| KR | 20060056281 A | | 5/2006 | |
| WO | WO-2004044525 A3 | * | 9/2004 | G01S 17/46 |
| WO | WO-2005047805 A2 | * | 5/2005 | F41G 1/38 |

* cited by examiner

METHOD AND SYSTEM FOR TESTING FIELD OF VIEW

The present disclosure is a 371 of PCT Application No. PCT/CN2018/117348, filed on Nov. 25, 2018, which claims priority to Chinese Patent Application No. 201711240834.X, filed on Nov. 30, 2017 and entitled "METHOD AND SYSTEM FOR TESTING FIELD OF VIEW", the entire contents of which are incorporated herein by reference.

TECHNICAL FIELD

The present disclosure relates to a method and system for testing a field of view.

BACKGROUND

The field of view (FOV) is an important performance of various image output devices, such as a head up display (HUD) and a virtual reality (VR) device. The FOV refers to an included angle between lines connecting an observation point to two points on opposite edges of an image output by the image output device. The FOV of an image output device needs to be detected to ensure that the FOV of the image output device meets product requirements before delivery of the image output device.

SUMMARY

Embodiments of the present disclosure provide a method and system for testing an FOV.

At least one embodiment of the present disclosure provides a method for testing an FOV. The method includes: arranging an image acquisition apparatus at a predetermined observation point of an image output device, and arranging a grid line apparatus at a predetermined distance in front of the image acquisition apparatus, a grid pattern arranged on one side of the grid line apparatus facing the image acquisition apparatus; controlling the image output device to output a test pattern; moving the grid line apparatus, and keeping a distance between the grid line apparatus and the image acquisition apparatus unchanged, such that a centerline of the grid pattern coincides with a centerline of the test pattern output by the image output device; capturing an image of the grid pattern and the test pattern by the image acquisition apparatus; and determining an FOV of the image output device according to a relationship between the test pattern and the grid pattern in the captured image.

In one implementation of embodiments of the present disclosure, the grid pattern is an equiangular grid pattern.

Optionally, the grid pattern is provided with black lines on a white background or white lines on a black background.

Optionally, the grid pattern is provided with scale values, wherein the scale value is intended to indicate a magnitude of the FOV corresponding to each line in the grid pattern.

Optionally, the grid pattern is provided with grid centerlines, wherein the grid centerlines include a horizontal centerline and a vertical centerline, and a color of the grid centerline is different from a color of the grid pattern.

In one implementation of embodiments of the present disclosure, the test pattern includes an outer frame and cross centerlines arranged inside the outer frame, the cross centerlines including a horizontal centerline and a vertical centerline; wherein maximum distances between portions of the outer frame on both sides of the horizontal centerline in the cross centerlines and the horizontal centerline in the cross centerlines are equal, and maximum distances between portions of the outer frame on both sides of the vertical centerline in the cross centerlines and the vertical centerline in the cross centerlines are equal.

Optionally, a color of the cross centerline is different from the color of the grid pattern and the color of the grid centerline respectively.

Optionally, determining the FOV of the image output device according to the relationship between the test pattern and the grid pattern in the captured image includes: determining an actual length and an actual width of the test pattern according to the captured image; and determining the FOV of the image output device according to the predetermined distance, and the actual length and the actual width of the test pattern.

In one implementation of embodiments of the present disclosure, determining the actual length and the actual width of the test pattern according to the captured image includes: determining a length and a width of the grid pattern in the image, and a length and a width of the test pattern in the image respectively; determining an actual length and an actual width of the grid pattern corresponding to the grid pattern in the image; and determining an actual length and an actual width of the test pattern according to the length and the width of the grid pattern in the image, the length and the width of the test pattern in the image, and the actual length and actual width of the grid pattern corresponding to the grid pattern in the image.

In one implementation of embodiments of the present disclosure, the FOV of the image output device includes a horizontal FOV and a vertical FOV, which are determined by the following formulas respectively:

$$FOV_{horizontal} = \arctan(C/S);$$

$$FOV_{vertical} = \arctan(D/S);$$

wherein $FOV_{horizontal}$ is the horizontal FOV of the image output device, $FOV_{vertical}$ is the vertical FOV of the image output device, C is the actual length of the test pattern, D is the actual width of the test pattern, and S is the predetermined distance.

Optionally, the predetermined distance is 5 to 20 meters.

Optionally, the image acquisition apparatus is a charge-coupled device (CCD) camera, a compound eye camera, or an integrated imaging camera.

Optionally, the image output device includes an HUD or a holographic image output device.

At least one embodiment of the present disclosure provides a system for testing FOV. The system includes an image acquisition apparatus and a grid line apparatus, wherein the image acquisition apparatus is arranged at a predetermined observation point of an image output device, and the grid line apparatus is arranged at a predetermined distance in front of the image acquisition apparatus, a grid pattern being arranged on one side of the grid line apparatus facing the image acquisition apparatus; and the image acquisition apparatus is configured to capture the grid pattern and a test pattern output by the image output device when a centerline of the grid pattern coincides with a centerline of the test pattern.

Optionally, the system for testing the FOV further includes: an image processing apparatus, configured to acquire the image captured by the image acquisition apparatus, and determine an FOV of the image output device according to a relationship between the test pattern and the grid pattern in the captured image.

In one implementation of embodiments of the present disclosure, the grid pattern is an equiangular grid pattern.

Optionally, the grid pattern is provided with black lines on a white background or white lines on a black background.

Optionally, the grid pattern is provided with scale values, wherein the scale value is intended to indicate a magnitude of the FOV corresponding to each line in the grid pattern.

Optionally, the grid pattern is provided with grid centerlines, wherein the grid centerlines include a horizontal centerline and a vertical centerline, and a color of the grid centerline is different from a color of the grid pattern.

In one implementation of embodiments of the present disclosure, the test pattern includes an outer frame and cross centerlines arranged inside the outer frame, the cross centerlines including a horizontal centerline and a vertical centerline; wherein maximum distances between portions of the outer frame on both sides of the horizontal centerline in the cross centerlines and the horizontal centerline in the cross centerlines are equal, and maximum distances between portions of the outer frame on both sides of the vertical centerline in the cross centerlines and the vertical centerline in the cross centerlines are equal.

Optionally, a color of the cross centerlines is different from the color of the grid pattern and the color of the grid centerline respectively.

Optionally, the predetermined distance is 5 to 20 meters.

Optionally, the image acquisition apparatus is a charge-coupled device (CCD) camera, a compound eye camera, or an integrated imaging camera.

Optionally, the image output device includes an HUD or a holographic image output device.

DETAILED DESCRIPTION

Embodiments of the present disclosure are described in further detail with reference to the accompanying drawings, to present the principles and advantages of the present disclosure more clearly.

Figure 1:
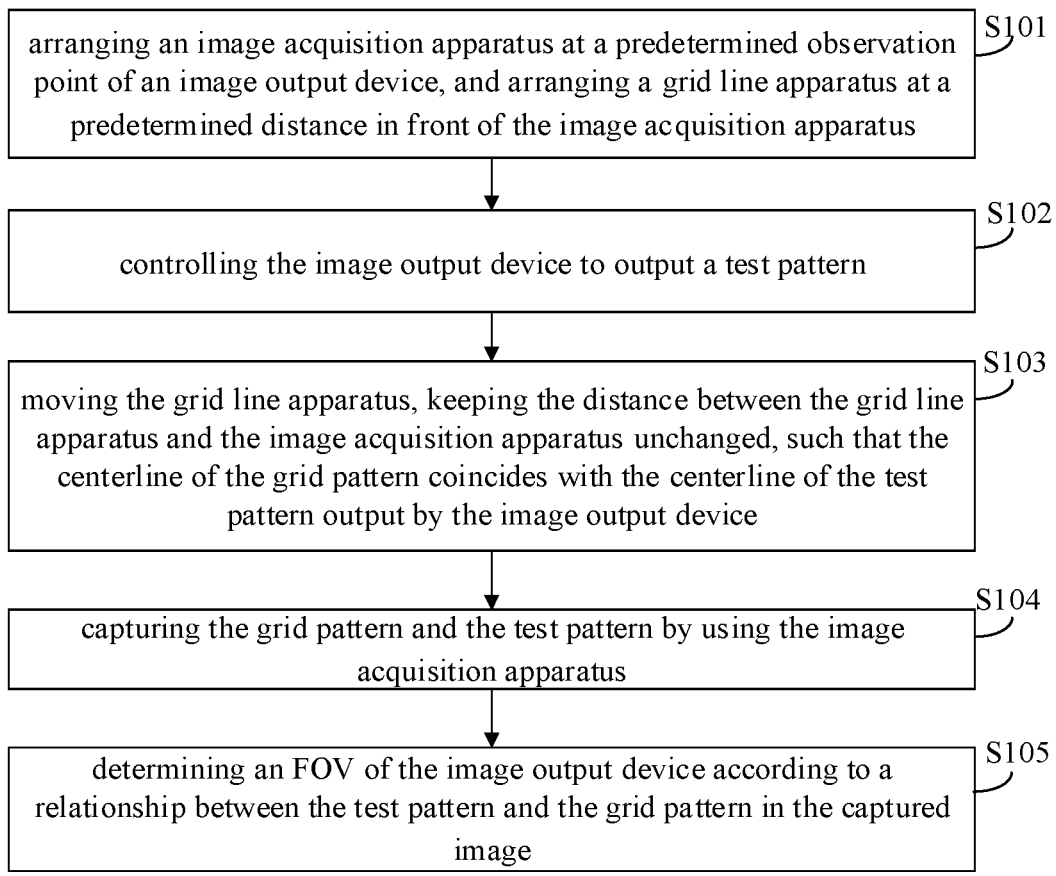
FIG. 1 is a schematic flowchart of a method for testing an FOV according to an embodiment of the present disclosure.

FIG. 1 is a schematic flowchart of a method for testing an FOV according to an embodiment of the present disclosure. The method for testing an FOV may be used to test an FOV of an image output device.

As shown in FIG. 1, the method includes the following steps. In step S101, an image acquisition apparatus is arranged at a predetermined observation point of an image output device, and a grid line apparatus is arranged at a predetermined distance in front of the image acquisition apparatus.

In this embodiment, the image output device refers to an image output device whose output image is not imaged on a physical imaging screen. The output image may be a virtual image (such as an output image of an HUD), or a real image (such as a holographic image output by a holographic image output device).

Figure 2:
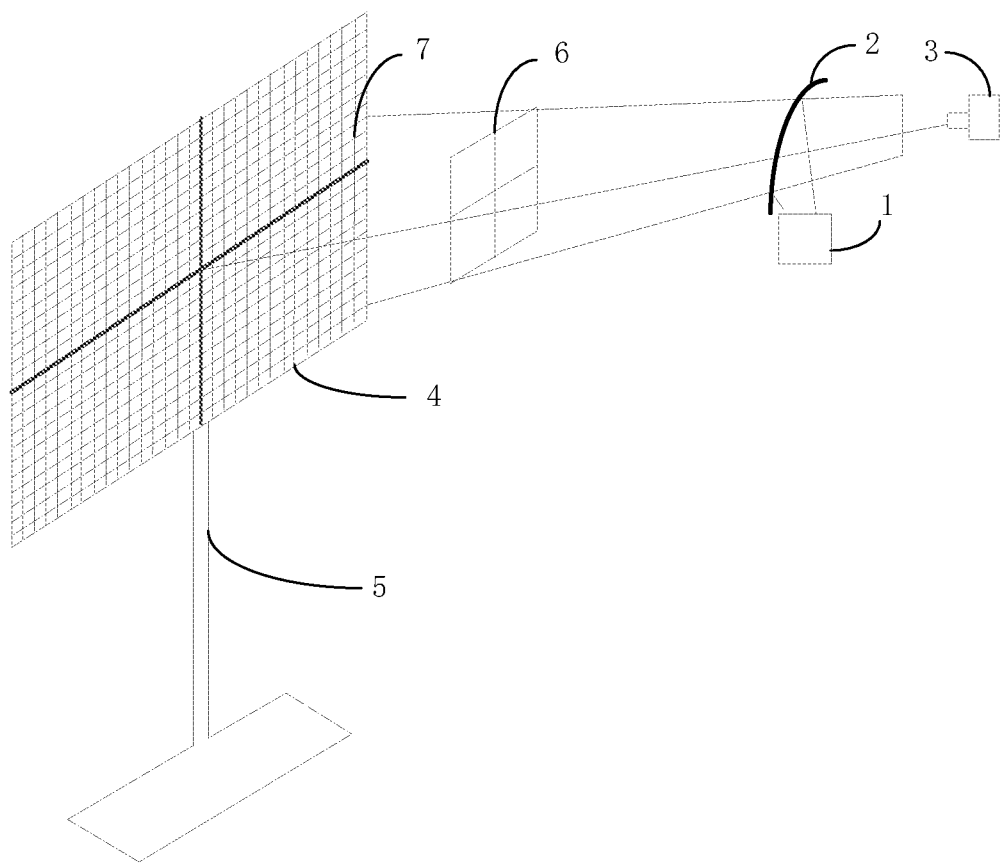
FIG. 2 is a schematic diagram of an application scenario of the method for testing the FOV according to an embodiment of the present disclosure.

FIG. 2 shows an application scenario of the method for testing the FOV in this embodiment by taking a case of testing an FOV of an HUD as an example. As shown in FIG. 2, the HUD generally includes a display source 1, an optical system (not shown in FIG. 2), and an imaging screen 2 (generally a front windshield of an automobile). The display source 1 is configured to output a test pattern 6 based on input image data. The test pattern 6 is projected onto the imaging screen 2 by the optical system, and imaged on one side of the imaging screen 2 distal from the image acquisition apparatus 3.

Figure 3:
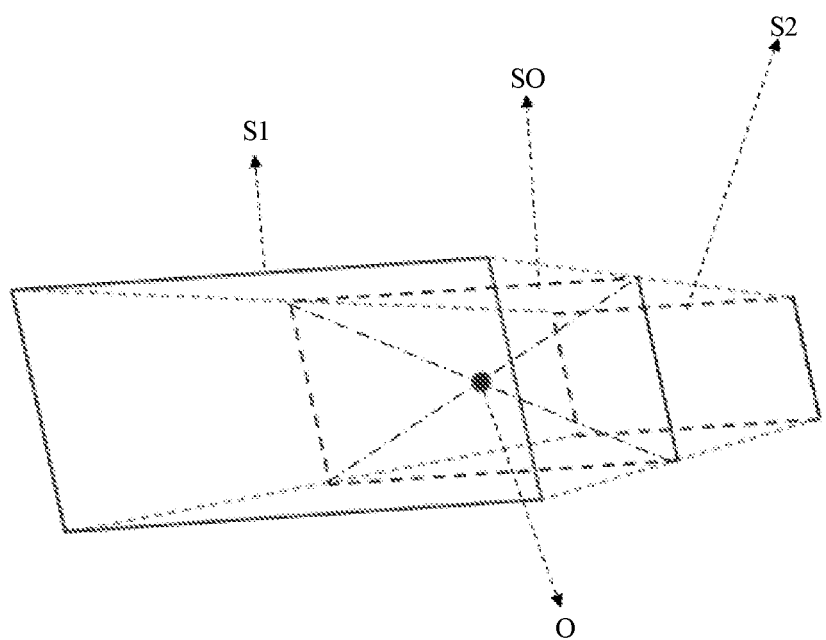
FIG. 3 is a schematic diagram of defining a predetermined observation point according to an embodiment of the present disclosure.

The image acquisition apparatus 3 is arranged at a predetermined observation point of the image output device. An optimal observation distance is generally defined for the image output device. A rectangular area which may be referred to as an eye box is defined at the optimal observation distance as an optimal observation area S0 (referring to FIG. 3). As shown in FIG. 3, the predetermined observation point may be a center point O of the rectangular area, that is, an intersection of diagonals of the rectangular area. For an HUD, a closest observation area S1 and a farthest observation area S2 are generally defined. The optimal observation area S0 is located between the closest observation area S1 and the furthest observation area S2. The rectangular area generally has a length of 140 mm to 160 mm, and a width of 40 mm to 60 mm. A horizontal height of the rectangular area may be defined according to actual needs. During the test, a center point O of the rectangular area and a center point of the test pattern may be generally defined at a same horizontal height. By arranging the image acquisition apparatus 3 at the predetermined observation point, it means that a center of a lens of the image acquisition apparatus 3 is arranged at the predetermined observation point and a centerline of the lens is aligned with a center point of the test pattern. Optionally, the image acquisition apparatus may be a CCD camera, a compound eye camera, an integrated imaging camera (also referred to as a light field camera), or the like.

In this embodiment, a grid pattern 7 is arranged on one side of the grid line apparatus 4 facing the image acquisition apparatus 3.

Optionally, the grid line apparatus 4 may include a bottom plate, and a coating or sticker arranged on one side of the bottom plate. This coating or sticker is configured to display the grid pattern 7. Alternatively, the grid line apparatus may be an electronic display screen, which is configured to display the grid pattern 7. For convenient alignment of the grid line apparatus 4 with an output image, the grid line apparatus 4 may be arranged on a holder 5. Optionally, for convenient adjustment of the position of the grid pattern, the holder 5 may further be provided with a lifting mechanism and/or a translation mechanism thereon. The lifting mechanism is configured to adjust a horizontal height of the grid pattern, and the translation mechanism is configured to adjust a horizontal position of the grid pattern. The lifting mechanism and the translation mechanism may adopt any conventional mechanism, including, but not limited to, a rack and pinion movement mechanism, a screw movement mechanism, or the like.

Figure 4A:
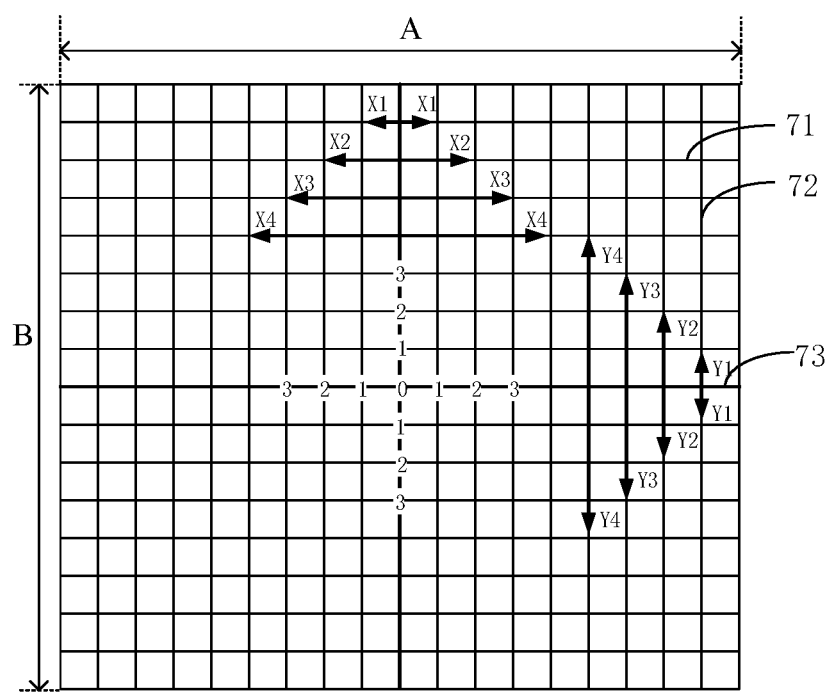
FIG. 4a is a schematic diagram of a grid pattern according to an embodiment of the present disclosure.
Figure 4B:
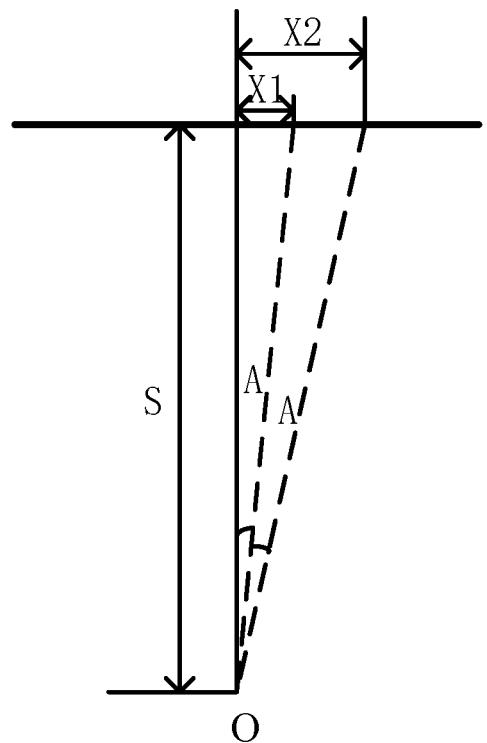
FIG. 4b is a schematic diagram of an equiangular grid pattern according to an embodiment of the present disclosure.

FIG. 4a is a schematic diagram of a grid pattern according to an embodiment of the present disclosure. This grid pattern 7 includes a plurality of first straight lines 71 arranged at intervals in parallel and a plurality of second straight lines 72 arranged at intervals in parallel. The first straight lines 71 and the second straight lines 72 are perpendicular to each other. The first straight lines 71 are generally horizontal lines, and the second straight lines 72 are generally vertical lines. In one implementation, the grid pattern 4 is an equiangular grid pattern. FIG. 4b is a schematic diagram of an equiangular grid pattern according to an embodiment of the present disclosure. As shown in FIG. 4b, in the equiangular grid pattern, an included angle between vertical lines from the predetermined observation point O to any two adjacent first straight lines 71 is a fixed angle A, and an included angle between vertical lines from the predetermined observation point O to any two adjacent second straight lines 72 is also the fixed angle A (in FIG. 4b, only lines in the middle of the grid pattern is used as an example for illustration). In practice, A is generally 1°. A may also be defined to other values according to actual situations, such as 0.5°, 1.5°, 2°, or the like.

Since a distance between the predetermined observation point O and the center point of the grid pattern is constant (the aforementioned predetermined distance), a distance between every two adjacent first straight lines and a distance between every two adjacent second straight lines may be determined by the following formulas:

$$Yn = S * \tan(n°),$$

$$Xm = S * \tan(m°),$$

wherein n represents the serial number of the first straight line from the horizontal centerline (for example, n=1 represents the first first straight line adjacent to the horizontal centerline of the grid pattern), m refers to the serial number of the second straight line from the vertical centerline (for example, m=1 represents the first second straight line adjacent to the vertical centerline of the grid pattern); n° represents the angle value corresponding to the $n^{th}$ first straight line; and m° represents the angle value corresponding to the number $m^{th}$ first straight line. Yn represents a distance between an $n^{th}$ first straight line from a horizontal centerline of the grid pattern and the horizontal centerline of the grid pattern (for example, Y1 represents a distance from the first straight line adjacent to the horizontal centerline of the grid pattern to the horizontal centerline of the grid pattern); Xm represents a distance between an $m^{th}$ second straight line from a vertical centerline of the grid pattern and the vertical centerline of the grid pattern (for example, X1 represents a distance from the second straight line adjacent to the vertical centerline of the grid pattern to the vertical centerline of the grid pattern); and S is the aforementioned predetermined distance, that is, a distance between the predetermined observation point O and the center point of the grid pattern.

Optionally, n≥10, m≥25.

Optionally, this grid pattern 7 is provided with black lines on a white background or white lines on a black background. The black lines on the white background mean that grid lines (that is, the first straight lines 71 which are horizontal lines and the second straight lines 72 which are vertical lines) are black lines, and portions other than the black lines are all white. Due to a high contrast between black and white, defining the grid pattern to white lines on the black background or black lines on the white background is conducive to obtaining a clear grid line image by the image acquisition apparatus and improving the accuracy of test results.

Optionally, the grid pattern 7 is provided with grid centerlines 73 to indicate the position of the centerline of the grid pattern. The grid centerlines 73 include a horizontal centerline and a vertical centerline. A color of the grid centerlines 73 is different from a color of the grid pattern 7, wherein the color of the grid pattern 7 includes the color of the grid lines and the color of the background in a grid pattern. In one example, the grid centerlines 73 may be red or green, such that the grid centerlines 73 are prominently displayed in the grid pattern 7, which facilitates alignment of the centerline of the test pattern with the centerline of the grid pattern in the subsequent process.

Optionally, the grid pattern 7 is provided with scale values thereon, the scale values being intended to indicate a magnitude of FOV corresponding to each line in the grid pattern 7. As shown by numbers in FIG. 4a, each of the first straight lines 71 and each of the second straight lines 72 correspond to a scale value. The scale value corresponds to the FOV corresponding to each first straight line 71 and each second straight line 72.

The grid line apparatus 4 is arranged in front of the image acquisition apparatus 3. That is, the grid line apparatus 4 is arranged in a direction to which the lens of the image acquisition apparatus 3 points. A distance between the grid line apparatus 4 and the image acquisition apparatus 3 is the predetermined distance, such that the grid line apparatus 4 is arranged around an imaging position of the image output device. Imaging distances of most of image output devices (i.e., the distance between an image output by the image output device and the predetermined observation point) are 3 m, 5 m, or 8 m. The imaging distances may subsequently develop to 20 m or more, or even 100 m or more. The predetermined distance may be 5 m to 20 m, such as 5 m to 10 m. The image can be presented in front of or behind the grid line apparatus or coincide with the grid line apparatus. This distance is defined by taking into account the focusing accuracy of the image acquisition device and an occupied space required by the method, and are thus suitable for testing most of the image output devices and has good applicability. In this embodiment, the predetermined distance may be 5 m.

In step S102 shown in FIG. 1, the image output device is controlled to output a test pattern.

In one example, a display source is turned on and image data of the test pattern is input to the display source, such that the image output device outputs the test pattern.

Figure 5:
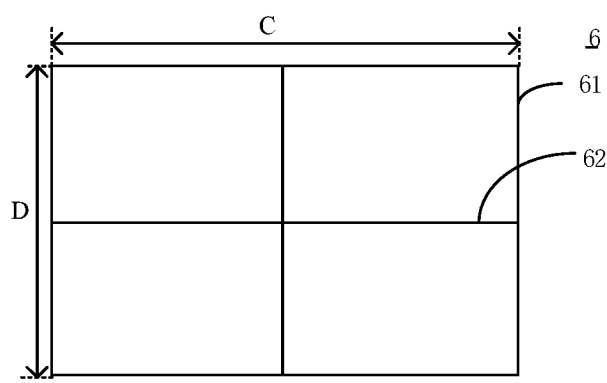
FIG. 5 is a schematic diagram of a test pattern according to an embodiment of the present disclosure.

FIG. 5 is a schematic diagram of a test pattern according to an embodiment of the present disclosure. As shown in FIG. 5, the test pattern 6 includes a rectangular outer frame 61 and cross centerlines 62. The cross centerlines 62 are intended to indicate the position of a centerline of the test pattern. The cross centerlines 62 include a horizontal centerline and a vertical centerline. The horizontal centerline coincides with a centerline of the rectangular outer frame 61 in a widthwise direction. The vertical centerline coincides with a centerline of the rectangular outer frame 61 in a lengthwise direction. A dimension of the rectangular outer frame 61 is determined by a maximum range of the image output by the image output device, that is, the position where the image output by the image output device is located may not exceed the rectangular outer frame.

In other embodiments, the outer frame of the test pattern may also be in other shapes, such as an ellipse and a diamond, as long as maximum distances between portions of the outer frame on both sides of the horizontal centerline in the cross centerlines and the horizontal centerline in the cross centerlines are equal; and maximum distances between portions of the outer frame on both sides of the vertical centerline in the cross centerlines and the vertical centerline in the cross centerlines are equal. In one example, if the outer frame of the test pattern is in a shape of an ellipse, the horizontal centerline and the vertical centerline in the cross centerlines are located on a major axis and a minor axis of the ellipse, respectively. If the outer frame of the test pattern is in a shape of a diamond, the cross centerlines are located on two diagonals of the diamond.

In an implementation of the embodiment of the present disclosure, a color of the cross centerlines 62 is different from the color of the grid pattern 7 and the color of the grid centerlines 73 respectively. In one example, when the grid pattern 7 is provided with white lines on a black background and the grid centerlines 73 are green, the color of the cross centerlines 62 may be red. The color of the cross centerlines 62 may be defined according to actual needs, as long as the color of the cross centerlines 62 may be easily distinguished from the color of the grid pattern 7. The color of the cross centerlines 62 is defined to be different from the colors of the grid pattern 7 and the grid centerlines 73, such that when the cross centerlines 62 of the test pattern 6 coincide with the grid pattern 7, the positions of the cross centerlines 62 relative to the grid pattern 7 are easily observed and the position of the grid pattern 7 are easily adjusted, and hence the cross centerlines 60 is aligned with the centerlines (i.e., indicated by the grid centerlines 73) of the grid pattern 7.

In a further implementation of the embodiment of the present disclosure, the color of the cross centerlines 62 may also be the same as the color of the grid pattern 7 or the color of lines in the grid centerlines 73. In one example, when the grid pattern 7 is provided with white lines on the black background and the grid centerlines 73 are green, the color of the cross centerlines 62 may be green or white.

Optionally, the outer frame and the cross centerlines may be the same or different in color, which is not be limited in the embodiment of the present disclosure. For ease of distinguishing the outer frame, the color of the outer frame may also be different from the color of the grid pattern.

In step S103 shown in FIG. 1, the grid line apparatus is moved, and the distance between the grid line apparatus and the image acquisition apparatus is kept unchanged, such that the centerline of the grid pattern coincides with the centerline of the test pattern output by the image output device.

Figure 6:
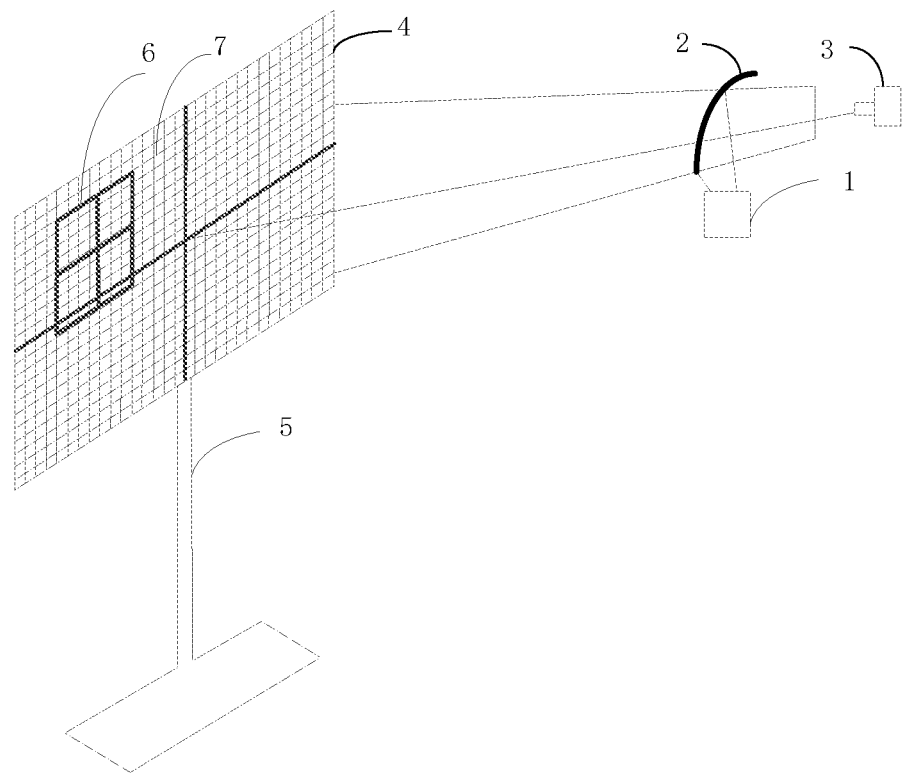
FIG. 6 is a schematic diagram of an initial alignment of the grid pattern and the test pattern according to an embodiment of the present disclosure.
Figure 7:
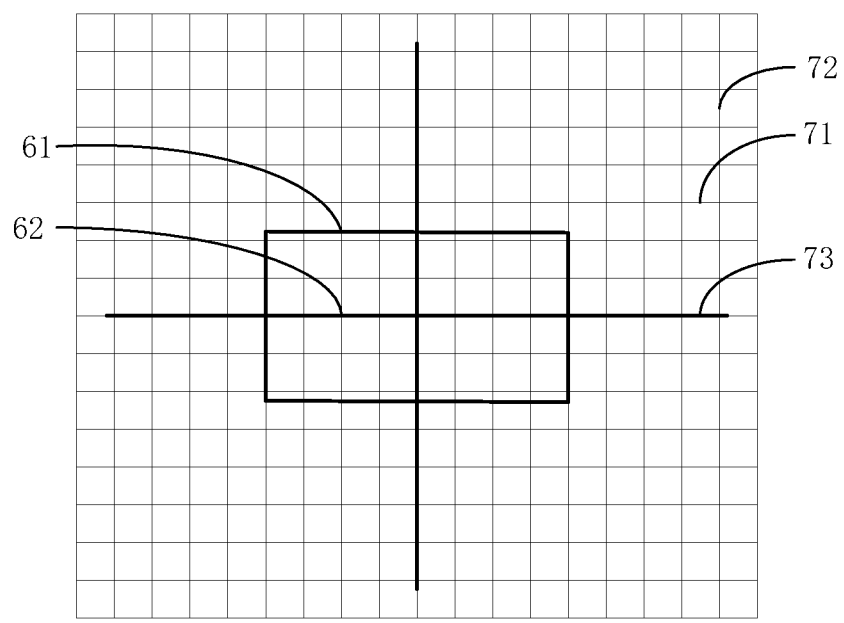
FIG. 7 is a schematic diagram of an alignment of the grid pattern and the test pattern according to an embodiment of the present disclosure.

As shown in FIG. 6, after the image output device outputs the test pattern, the center positions of the test pattern 6 and the grid pattern 7 may be more distal from each other. In this case, the position of the grid line apparatus 4 needs to be adjusted, such that the centerline of the grid pattern 7 coincides with the centerline of the test pattern 6 output by the image output device, as shown in FIG. 7.

In step S104 shown in FIG. 1, the grid pattern and the test pattern are captured by using the image acquisition apparatus.

In one example, the image acquisition apparatus may be configured to capture an image by focusing on the grid centerlines 73 or the cross centerlines 62.

In step S105 shown in FIG. 1, an FOV of the image output device is determined according to a relationship between the test pattern and the grid pattern in the captured image.

In the embodiment of the present disclosure, step S105 may include: determining an actual length and an actual width of the test pattern according to the captured image; and determining the FOV of the image output device according to the predetermined distance, and the actual length and the actual width of the test pattern.

Figure 8:
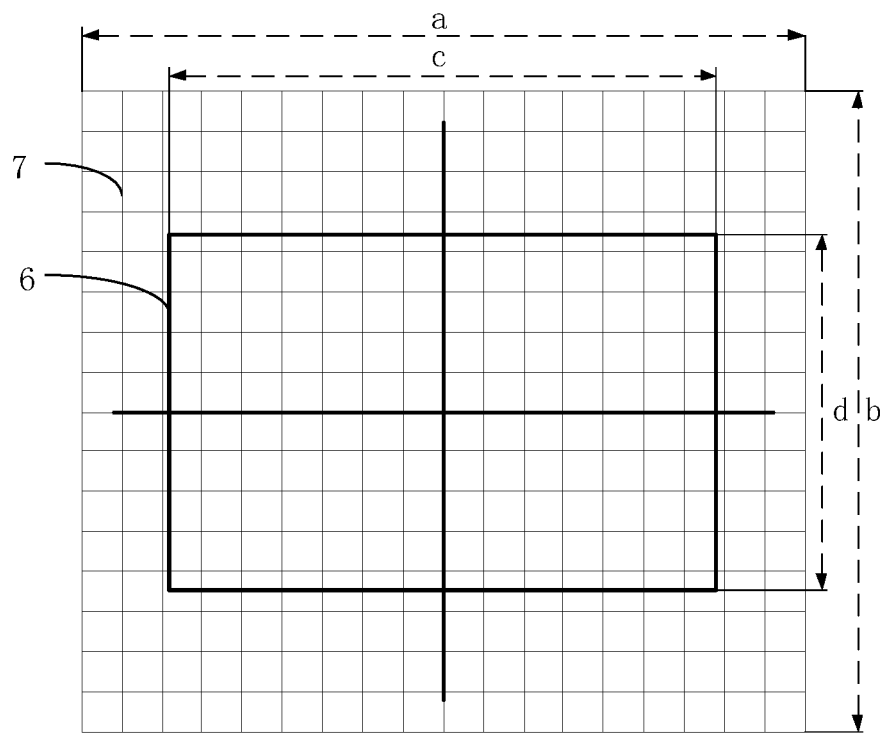
FIG. 8 is a schematic diagram of a captured image according to an embodiment of the present disclosure.

As shown in FIG. 8, determining the actual length and the actual width of the test pattern according to the captured image may include: determining a length a and a width b of the grid pattern 7 in the captured image, and a length c and a width d of the test pattern 6 in the captured image respectively; determining an actual length A and an actual width B of the grid pattern corresponding to the grid pattern 7 in the image; and determining an actual length C and an actual width D of the test pattern according to the length a and the width b of the grid pattern in the captured image, the length c and the width d of the test pattern 6, and the actual length A and the actual width B of the grid pattern corresponding to the grid pattern in the captured image.

Exemplarily, the grid pattern in the captured image may be all or part of the grid pattern output by the image output device.

In an implementation of the embodiment of the present disclosure, determining the length and the width of the test pattern in the captured image, and the length and the width of the grid pattern in the captured image may be implemented manually. In one example, the length c and the width d of the test pattern and the length a and the width b of the grid pattern in the captured image are determined by manual measurement.

Since the actual length and the actual width of the grid pattern corresponding to the grid pattern in the captured image are known, in one example, the length and the width may be directly obtained by measuring the grid pattern 7 on the grid line apparatus 4, and a ratio of the test pattern to the grid pattern in the captured image is the same as an actual ratio of the test pattern to the grid pattern. Thus, the actual length and the actual width of the test pattern may be determined according to a first ratio, a second ratio, and the actual length and the actual width of the grid pattern corresponding to the grid pattern in the image. In one example, the first ratio is a ratio of the length a of the grid pattern in the captured image to the length c of the test pattern in the captured image, and the second ratio is a ratio of the width b of the grid pattern in the captured image to the width d of the test pattern in the captured image.

Specifically, the actual length C and the actual width D of the test pattern may be determined by the following formula (1) and formula (2):

$$a/c = A/C, \qquad (1)$$

$$b/d = B/D. \qquad (2)$$

In a further implementation of the embodiment of the present disclosure, determining the length and the width of the test pattern, and the length and the width of the grid pattern in the captured image may be automatically implemented. In one example, taking a case of determining the length and the width of the test pattern as an example, the captured image is first transmitted to an image processing device (such as a computer) for image processing, a position of the outer frame of the test pattern is determined, and the length and the width of the test pattern are then determined according to the position of the outer frame.

Alternatively, the position of the outer frame of the test pattern may be determined by: converting the image into a grayscale image, then determining lines in the image by using an edge detection algorithm, and recognizing the outer frame of the test pattern from the lines of the image, and thus determining the position of the outer frame of the test pattern. It should be noted that the embodiment of the present disclosure may be implemented by using any image processing technology for detecting the outer frame of the test pattern, which is not limited in the present disclosure.

The length of the test pattern may be determined according to the position of the outer frame by: determining a maximum coordinate value and a minimum coordinate value of each point on the outer frame in a horizontal direction (X direction), and calculating the length of the test pattern in the image according to the maximum coordinate value and the minimum coordinate value in the horizontal direction; determining a maximum coordinate value and a minimum coordinate value of each point on the outer frame in a vertical direction (Y direction), and calculating the width of the test pattern in the image according to the maximum coordinate value and the minimum coordinate value in the vertical direction.

Nevertheless, determining the length and the width of the test pattern and the length and width of the grid pattern in the captured image may be semi-automatically implemented. For example, an operator specifies two sidelines of the outer frame of the test pattern or two points on the outer frame with the help of the image processing apparatus. The image processing apparatus then automatically calculates a distance between the two sidelines or the two points to obtain the length and the width of the test pattern in the image. The length and the width of the grid pattern in the image may also be determined in the same way.

Figure 10:
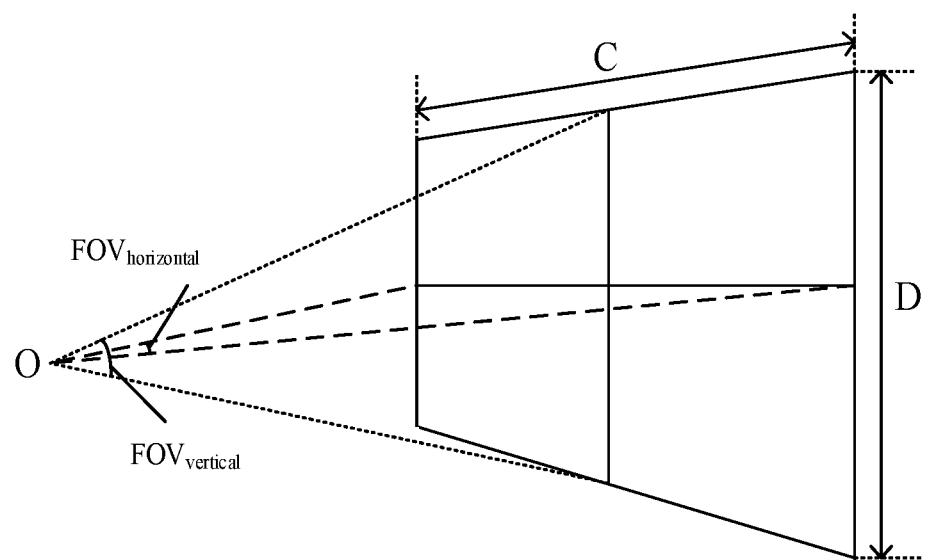
FIG. 10 is a schematic diagram of a horizontal FOV and a vertical FOV of the image output device according to some embodiments of the present disclosure.

In one example, determining the FOV of the image output device according to the predetermined distance and the actual length and the actual width of the test pattern may include:

determining a horizontal FOV $FOV_{horizontal}$ of the image output device according to formula (3):

$$FOV_{horizontal} = \arctan(C/S) \quad (3),$$

wherein C is the actual length of the test pattern, and S is the aforementioned predetermined distance;

determining a vertical FOV $FOV_{vertical}$ of the image output device according to formula (4):

$$FOV_{vertical} = \arctan(D/S) \quad (4),$$

wherein D is the actual width of the test pattern, and S is the aforementioned predetermined distance; and determining the FOV of the image output device accurately according to the above formula (3) and formula (4). FIG. 10 shows the horizontal FOV $FOV_{horizontal}$ of the image output device and the vertical FOV $FOV_{vertical}$ of the image output device.

Figure 9:
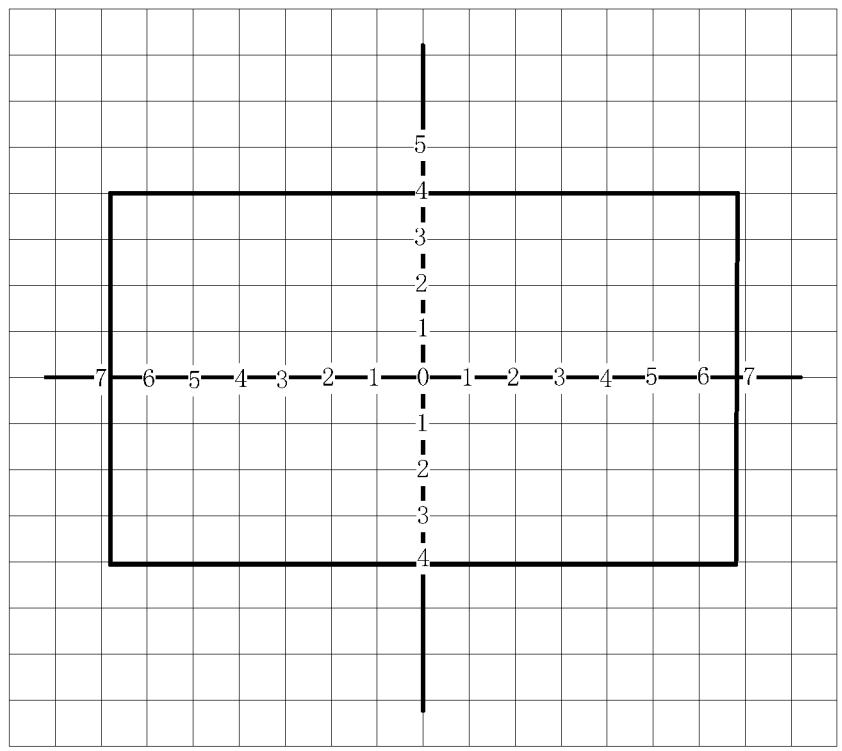
FIG. 9 is a schematic diagram of another alignment of the grid pattern and the test pattern according to an embodiment of the present disclosure.

In a further embodiment of the present disclosure, if the grid pattern 7 is provided with scale values thereon, the FOV of the image output device may be directly determined according to the scale values, rather than the above formulas. In one example, if the test pattern in FIG. 9 is proximal to seventh vertical lines to the left and to the right of the vertical centerline of the grid pattern in the length direction respectively, and the FOV corresponding to the seventh vertical lines is 7°, the horizontal FOV approaches 14°. If the test pattern coincides with fourth horizontal lines above and below the horizontal centerline of the grid pattern in a width direction, and the FOV corresponding to the fourth horizontal lines is 4°, the vertical field angle is 8°. Alternatively, the magnitude of the FOV may be further estimated according to the closeness of the test pattern to the vertical lines. In one example, in the case shown in FIG. 9, when the test pattern is close to the seventh vertical lines to the left and to the right of the vertical centerline of the grid pattern in the length direction respectively, the horizontal FOV may be estimated to be 13.7°. By defining the scale values, the FOV corresponding to the test pattern may be directly determined, which is fast and convenient, and is especially suitable for cases where the FOV does not need to be accurately determined.

The FOV of the image output device may be determined according to the relationship between the grid pattern and the test pattern in the captured image by arranging the image acquisition apparatus at the predetermined observation point of the image output device to capture an image of the grid pattern arranged on the grid line apparatus and the test pattern output by the image output device, and ensuring that the distance between the grid line apparatus and the image acquisition apparatus is unchanged during capturing and that the centerline of the grid pattern coincides with the centerline of the test pattern output by the image output device, which is convenient to implement.

An embodiment of the present disclosure further provides a system for testing FOV. The test system includes a grid line apparatus and an image acquisition apparatus. The image acquisition apparatus is arranged at a predetermined observation point of an image output device, the grid line apparatus is arranged at a predetermined distance in front of the image acquisition apparatus, and a grid pattern is arranged on one side of the grid line apparatus facing the image acquisition apparatus. The image acquisition apparatus is configured to capture the grid pattern and a test pattern output by the image output device when the centerline of the grid pattern coincides with the centerline of the test pattern.

For detailed descriptions of the grid line apparatus and the image acquisition apparatus, reference may be made to the related description of the method embodiment shown in FIG. 1, and the detailed descriptions thereof are not given herein any further.

In an implementation, the FOV of the image output device may be determined manually according to the relationship between the test pattern and the grid pattern in the captured image captured by the image acquisition apparatus.

In a further implementation, the FOV may be determined by an image processing apparatus. In such implementation, the system for testing the FOV includes an image processing apparatus which is connected to the image acquisition apparatus, and configured to acquire an image captured by the image acquisition apparatus, and determine the FOV of the image output device according to the relationship between the test pattern and the grid pattern in the captured image. For details about acquiring the FOV of the image output device by the image processing apparatus, reference can be made to the foregoing description of step S105, and the details thereof are not given herein any further. The image processing apparatus may be a device such as a computer.

The FOV of the image output device may be determined according to the relationship between the grid pattern and the test pattern in the captured image by arranging the image acquisition apparatus at the predetermined observation point of the image output device to capture an image of the grid pattern arranged on the grid line apparatus and the test pattern output by the image output device, and ensuring that the distance between the grid line apparatus and the image acquisition apparatus is unchanged during capturing and that the centerline of the grid pattern coincides with the centerline of the test pattern output by the image output device, which is convenient to implement.

Described above are merely exemplary embodiments illustrating the present disclosure, which are not intended to limit the scope of the present disclosure. Within the spirit and principles of the disclosure, any modifications, equivalent substitutions, improvements, or the like are within the protection scope defined by the appended claims of the present disclosure.

What is claimed is:

1. A method for testing a field of view, comprising:
    arranging an image acquisition apparatus at a predetermined observation point of an image output device, and arranging a grid line apparatus at a predetermined distance in front of the image acquisition apparatus, a grid pattern arranged on one side of the grid line apparatus facing the image acquisition apparatus, wherein the image output device comprises a head up display or a holographic image output device;
    controlling the image output device to output a test pattern;
    moving the grid line apparatus, and keeping a distance between the grid line apparatus and the image acquisition apparatus unchanged, such that a centerline of the grid pattern coincides with a centerline of the test pattern output by the image output device;
    capturing an image of the grid pattern and the test pattern by the image acquisition apparatus; and
    determining a field of view of the image output device according to a relationship between the test pattern and the grid pattern in the captured image, which comprises:
        determining a physical length and a physical width of the test pattern according to the captured image; and
        determining the field of view of the image output device according to the predetermined distance, and the physical length and the physical width of the test pattern, which comprises:
            determining a length and a width of the grid pattern in the image, and a length and a width of the test pattern in the image respectively;
            determining a physical length and a physical width of the grid pattern corresponding to the grid pattern in the image; and
            determining a physical length and a physical width of the test pattern according to the length and the width of the grid pattern in the image, the length and the width of the test pattern in the image, and the physical length and physical width of the grid pattern corresponding to the grid pattern in the image.

2. The method for testing the field of view according to claim 1, wherein the grid pattern is an equiangular grid pattern.

3. The method for testing the field of view according to claim 2, wherein the grid pattern is provided with scale values, the scale value indicating an angle value of the field of view corresponding to each line in the grid pattern.

4. The method for testing the field of view according to claim 2, wherein the grid pattern includes black lines on a white background or white lines on a black background.

5. The method for testing the field of view according to claim 4, wherein grid centerlines are provided on the grid pattern, the grid centerlines comprising a horizontal centerline and a vertical centerline, and a color of the grid centerline being different from a color of the grid pattern.

6. The method for testing the field of view according to claim 5, wherein the test pattern comprises an outer frame and cross centerlines arranged inside the outer frame, the cross centerlines comprising a horizontal centerline and a vertical centerline; wherein maximum distances between portions of the outer frame on both sides of the horizontal centerline in the cross centerlines and the horizontal centerline in the cross centerlines are equal, and maximum distances between portions of the outer frame on both sides of the vertical centerline in the cross centerlines and the vertical centerline in the cross centerlines are equal.

7. The method for testing the field of view according to claim 6, wherein a color of the cross centerlines is different from the color of the grid pattern and the color of the grid centerline respectively.

8. The method for testing the field of view according to claim 1, wherein the FOV of the image output device comprises a horizontal field of view and a vertical field of view, which are determined by the following formulas respectively:

$FOV_{horizontal}$=arctan (C/S);
    $FOV_{vertical}$=arctan (D/S);
    wherein $FOV_{horizontal}$ is the horizontal field of view of the image output device, $FOV_{vertical}$ is the vertical field of view of the image output device, C is the physical length of the test pattern, D is the physical width of the test pattern, and S is the predetermined distance.

9. A system for testing a field of view, comprising an image acquisition apparatus and a grid line apparatus, wherein the image acquisition apparatus is arranged at a predetermined observation point of an image output device, and the grid line apparatus is arranged at a predetermined distance in front of the image acquisition apparatus, a grid pattern being arranged on one side of the grid line apparatus facing the image acquisition apparatus; and the image acquisition apparatus is configured to capture the grid pattern and a test pattern output by the image output device when the centerline of the grid pattern coincides with the centerline of the test pattern to obtain a captured image,
    wherein the image acquisition apparatus comprises a charge-coupled device camera, a compound eye camera, or an integrated imaging camera; the image output device comprises a head up display or a holographic image output device; and the grid line apparatus comprises a bottom plate, wherein the bottom plate is provided with a coating or sticker on an entire surface of a side opposite to the image acquisition apparatus, and the coating or sticker presents the grid pattern, or the grid line apparatus is an electronic display device with a display screen which is configured to display the grid pattern,
    the system further comprising an image processing apparatus, wherein the image processing apparatus comprises a processor and a memory;
    the memory is configured to store at least one instruction that, when loaded and executed by the processor, causes the image processing apparatus to perform acquiring the captured image, and determining a field of view of the image output device according to a relationship between the test pattern and the grid pattern in the captured image,
    wherein determining the field of view of the image output device according to the relationship between the test pattern and the grid pattern in the captured image comprises:

determining a physical length and a physical width of the test pattern according to the captured image; and determining the field of view of the image output device according to the predetermined distance, and the physical length and the physical width of the test pattern, which comprises:

determining a length and a width of the grid pattern in the image, and a length and a width of the test pattern in the image respectively;

determining a physical length and a physical width of the grid pattern corresponding to the grid pattern in the image; and determining a physical length and a physical width of the test pattern according to the length and the width of the grid pattern in the image, the length and the width of the test pattern in the image, and the physical length and physical width of the grid pattern corresponding to the grid pattern in the image.

10. The system for testing the field of view according to claim 9, wherein the grid pattern is an equiangular grid pattern.

11. The system for testing the field of view according to claim 10, wherein the grid pattern is provided with scale values, the scale value indicating an angle value of the field of view corresponding to each line in the grid pattern.

12. The system for testing the field of view according to claim 10, wherein the grid pattern includes black lines on a white background or white lines on a black background.

13. The system for testing the field of view according to claim 12, wherein grid centerlines are provided on the grid pattern, the grid centerlines comprising a horizontal centerline and a vertical centerline, and a color of the grid centerline being different from a color of the grid pattern.

14. The system for testing the field of view according to claim 13, wherein the test pattern comprises an outer frame and cross centerlines arranged inside the outer frame, the cross centerlines comprising a horizontal centerline and a vertical centerline; wherein maximum distances between portions of the outer frame on both sides of the horizontal centerline in the cross centerlines and the horizontal centerline in the cross centerlines are equal, and maximum distances between portions of the outer frame on both sides of the vertical centerline in the cross centerlines and the vertical centerline in the cross centerlines are equal.

15. The system for testing the field of view according to claim 14, wherein a color of the cross centerline is different from the color of the grid pattern and the color of the grid centerline respectively.

* * * * *